United States Patent
Hitomi et al.

(10) Patent No.: US 7,028,937 B2
(45) Date of Patent: Apr. 18, 2006

(54) REEL UNIT FOR SPINNING REEL

(75) Inventors: Yasuhiro Hitomi, Hashimoto (JP); Tomohiro Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/764,587

(22) Filed: Jan. 27, 2004

(65) Prior Publication Data

US 2004/0200916 A1 Oct. 14, 2004

(30) Foreign Application Priority Data

Feb. 5, 2003 (JP) ............................ 2003-028470
Feb. 25, 2003 (JP) ............................ 2003-047717

(51) Int. Cl.
*A01K 89/01* (2006.01)
(52) U.S. Cl. ...................... 242/311; 242/310
(58) Field of Classification Search ................ 242/310, 242/311, 312
See application file for complete search history.

(56) References Cited

U.S. PATENT DOCUMENTS

| | | | | |
|---|---|---|---|---|
| 3,020,665 A | * | 2/1962 | Dell | 43/20 |
| 3,296,731 A | * | 1/1967 | Wood | 242/240 |
| 5,540,397 A | * | 7/1996 | Yoshikawa | 242/311 |
| 5,788,173 A | | 8/1998 | Kawabe | |
| 6,016,982 A | * | 1/2000 | Asano et al. | 242/310 |
| 6,409,113 B1 | * | 6/2002 | Hirayama et al. | 242/310 |
| 2002/0056776 A1 | * | 5/2002 | Sugawara | 242/231 |
| 2003/0146324 A1 | * | 8/2003 | Yeh | 242/311 |
| 2003/0146325 A1 | * | 8/2003 | Kitajima | 242/311 |

* cited by examiner

*Primary Examiner*—Kathy Matecki
*Assistant Examiner*—Evan Langdon
(74) *Attorney, Agent, or Firm*—Shinjyu Global IP Counselors, LLP

(57) ABSTRACT

A reel unit has a housing unit, a first lid, a second lid, and a rod-attachment portion. The housing unit has an accommodation space formed in the interior thereof that accommodates and supports a drive mechanism. The drive mechanism has a master gear non-rotatably coupled to a master gear shaft. The first lid is made of a metal and is fixedly coupled to the housing unit to interpose the master gear with the housing unit. The second lid is made of a synthetic resin and is fixedly coupled to the housing unit to close the accommodation space. The rod-attachment portion is formed integrally with the housing unit and can be mounted onto a fishing rod.

16 Claims, 11 Drawing Sheets

REEL UNIT FOR SPINNING REEL

BACKGROUND OF THE INVENTION

1. Field of the Invention

The present invention relates to a reel unit. More specifically, the present invention relates to a reel unit for a spinning reel that is adapted to be mounted on fishing rod and in which rotation of a handle is transmitted to a rotor and a spool via a master gear to wind fishing line around the spool.

2. Background Information

A conventional reel unit for a spinning reel includes a rod-attachment portion, a housing unit, and first and second lids. The rod-attachment portion can be mounted to a fishing rod. The housing unit is integrally formed with the rod-attachment portion. The first lid and the second lid are detachably installed on both sides of the housing unit. This type of spinning reel is shown in Japanese Published Utility Model Application No. 54-172887.

The housing unit is made of a metal, and maintains a high level of strength. A variety of drive mechanisms are mounted in the interior of the housing unit, such as a mechanism that rotates the rotor and a mechanism that moves the spool back and forth. The first and second lids are configured such that their outer contours have the same size as the housing unit. The first and second lids are made of a synthetic resin, and protect the housing unit. A master gear rotation shaft (master gear shaft) provided on a master gear is rotatively supported by the first and second lids. The master gear is disposed toward a side of the spool shaft where there is the master gear shaft, e.g., near the first lid.

Recently, there are demands that spinning reels, particularly spinning reels for long distance cast fishing, be designed to maintain a specific strength and have a reduced weight in order to make casting easier. With the aforementioned conventional three piece reel unit for a spinning reel, the overall desired weight of the reel unit can be realized because both lids that support the master gear shaft are made of a synthetic resin. However, the specific strength of the reel unit cannot be sufficiently maintained. For example, when a large fish is hooked and a large load is applied to the master gear, an excessively large force may be applied to the first lid near the master gear and the first lid may be damaged.

In view of the above, it will be apparent to those skilled in the art from this disclosure that there exists a need for an improved a reel unit for a spinning reel. This invention addresses this need in the art as well as other needs, which will become apparent to those skilled in the art from this disclosure.

SUMMARY OF THE INVENTION

It is an object of the present invention to provide a three piece reel unit for a spinning reel that maintains its relative strength and is lightweight.

A reel unit for a spinning reel in accordance with a first aspect of the present invention is adapted to be mounted onto a fishing rod. The rotation of a handle is transmitted to a rotor to wind fishing line onto a spool. The reel unit includes a housing unit, a master gear, a first lid, a second lid, and a rod-attachment portion. The housing unit has a mechanism accommodation space in the interior thereof that accommodates and supports a drive mechanism to drive the spool and the rotor. The master gear is non-rotatably coupled to a master gear shaft and is disposed inside the mechanism accommodation space for transmitting rotation of the handle to the rotor. The first lid is preferably made of a metal and is coupled to the housing unit so as to interpose the master gear with the housing unit. The first lid is rotatably supporting the master gear shaft. The second lid is made of a synthetic resin and is coupled to the housing unit such so as to close the mechanism accommodation space. The rod-attachment portion is formed integrally with the housing unit or the first lid, and is adapted to be mounted to the fishing rod.

With this three-piece reel unit, the drive mechanism is supported inside the mechanism accommodation space of the housing unit. One surface of the housing unit is covered with the first lid made of a metal such that the master gear is disposed near the first lid. Further, the first lid supports the master gear shaft of the master gear on the rear surface side of the master gear. Here, by making the first lid out of a light alloy which has a small specific gravity among metals, it becomes possible to maintain a high specific strength of the first lid, when master gear is disposed near the first lid and a relatively large force is easily applied to the support portion of the first lid. In addition, the second lid, which is far from the master gear and on which a large force tends not to be applied, can be made of a synthetic resin to reduce weight. Thus, with regard to the reel unit as a whole, the specific strength thereof can be maintained and the weight thereof can be reduced.

A reel unit for a spinning reel in accordance with a second aspect of the present invention is the reel unit of the first aspect, in which the first and second lids respectively have first and second shaft support portions that support both ends of the master gear shaft. Here, the handle can be mounted on either the left or right side of the reel unit because the shaft support portions that support the ends of the rotation shaft of the master gear are provided on both lids. Thus, the rigidity of the structures that support the rotation shaft can be maintained at a high level because the rotation shaft of the master gear is supported at both ends thereof.

A reel unit for a spinning reel in accordance with a third aspect of the present invention is the reel unit of the first aspect, in which the first lid has a shaft support portion to cantilever the master gear shaft. Here, the master gear shaft is cantilevered, and thus, the thickness of the reel unit along the direction of the rotation master gear shaft can be reduced. In addition, since the master gear shaft does not pass through the reel unit, the master gear shaft will not interfere with the drive mechanism, thus making it easy to arrange the drive mechanism.

A reel unit for a spinning reel in accordance with a fourth aspect of the present invention is the reel unit of the third aspect, in which the shaft support portion rotatably supports the master gear shaft with a pair of bearings that are axially spaced apart.

A reel unit for a spinning reel in accordance with a fifth aspect of the present invention is the reel unit of any of the first to fourth aspects, in which the housing unit is made of a magnesium alloy.

A reel unit for a spinning reel in accordance with a sixth aspect of the present invention is the reel unit of any of the first to fifth aspects, in which the first lid is made of an aluminum alloy. Here, since the housing unit is made of a magnesium alloy and the first lid is made of an aluminum alloy, which has a higher specific strength than a magnesium alloy, the specific strength can be maintained at a high level and the weight can be further reduced. Moreover, the corrosion resistance of the reel unit can be improved because both lids, to which other members come into contact, are more difficult to corrode than the housing unit.

The reel unit for a spinning reel in accordance with a seventh aspect of the present invention is the reel unit of any one of first to sixth aspects, in which the rod-attachment portion is integrally formed with the housing unit. Here, good lateral balance is achieved because the housing unit and the rod-attachment portion, which are located in the center and interposed between the lids, are formed integrally.

The reel unit for a spinning reel in accordance with an eighth aspect of the present invention is the reel unit of any one of first to sixth aspects, in which the rod-attachment portion is integrally formed with the first lid. Here, if the thick-walled rod-attachment portion is formed integrally with the first lid, variation in the wall thickness of the housing unit will be reduced. Thus, deformation such as shrinkage or the like due to variations in the wall thickness when the housing unit is molded from a resin or a metal can be easily prevented.

The reel unit for a spinning reel in accordance with a ninth aspect of the present invention is the reel unit of any one of first to eighth aspects, in which the housing unit includes at least one through hole formed therein. One of the first and second lids includes at least one projection projecting toward the housing unit and each having a threaded portion formed therein. The projection is inserted into the through hole formed in the housing unit. The other of the first and second lids is coupled to the housing unit by being coupled to the projection with a screw member.

The reel unit for a spinning reel in accordance with a tenth aspect of the present invention is the reel unit of the ninth aspect, in which the first lid has at least one projection, and the projection has a female threaded portion formed thereon, in which the screw member is threadedly coupled.

The reel unit for a spinning reel in accordance with an eleventh aspect of the present invention is the reel unit of the ninth aspect, in which the second lid has at least one projection, the projection has a tapping hole formed thereon, and the screw member is a tapping screw that is threadedly coupled into the tapping hole.

A reel unit for a spinning reel in accordance with still another aspect of the present invention is the reel unit of any one of the first to eleventh aspects, in which the first and second lids are fixedly coupled to the housing unit with a plurality of screws, and at least one of the screws retains the drive mechanism. Here, the drive mechanism is also fixedly retained by the screws that couple the lids, and thus the number of parts can be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
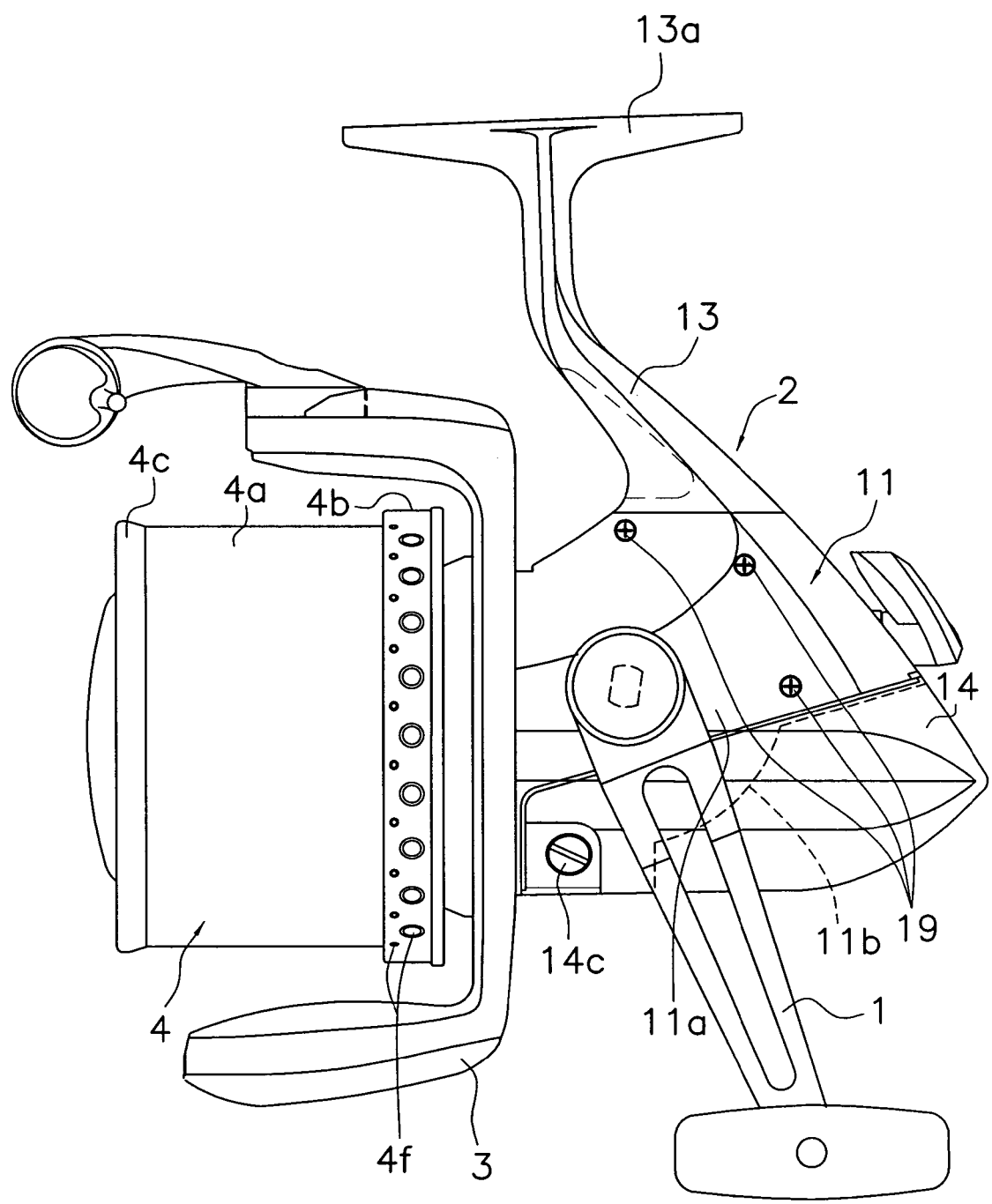
FIG. 1 is a side view of a spinning reel in accordance with a preferred embodiment of the present invention.
Figure 2:
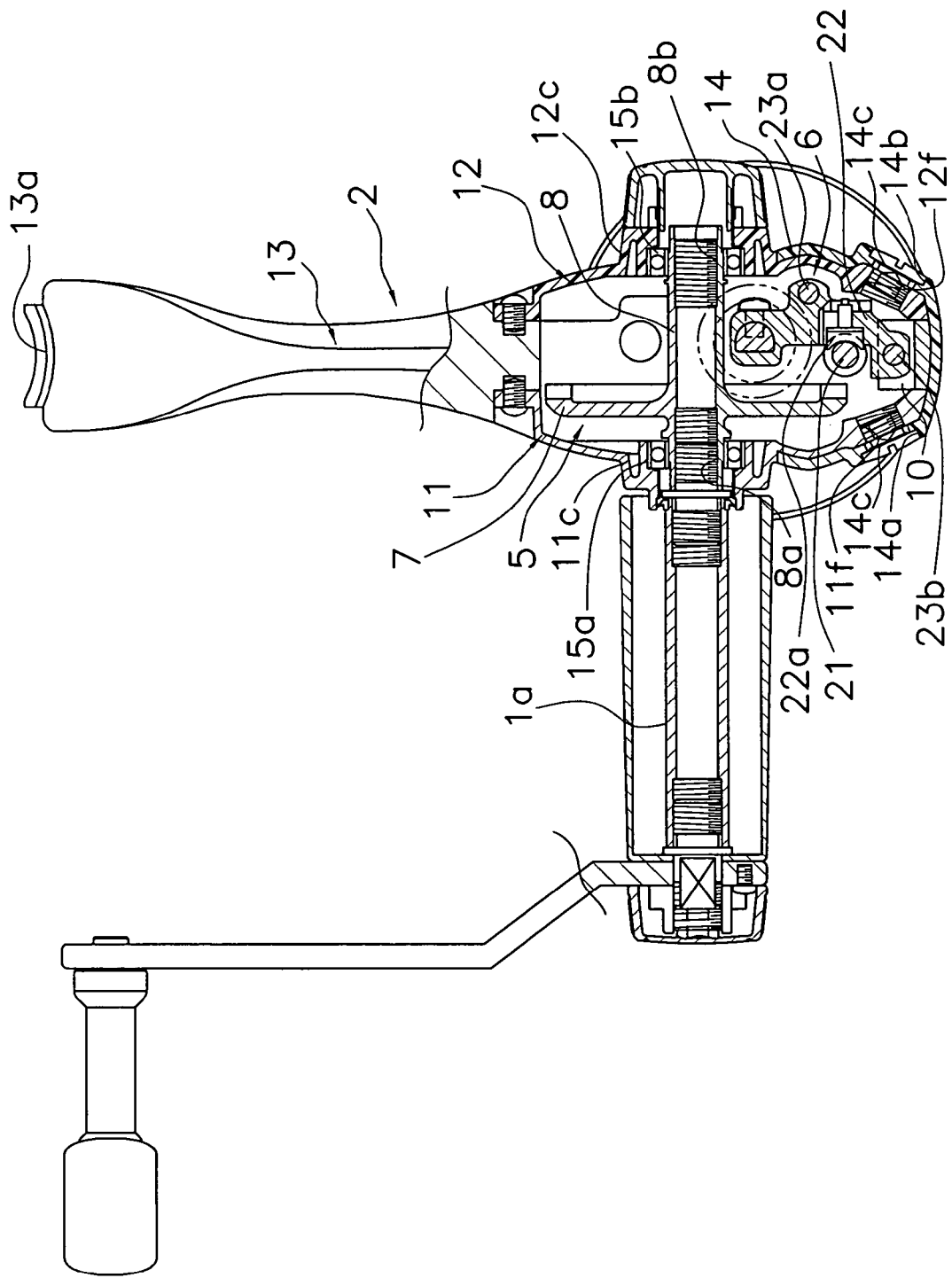
FIG. 2 is a cross-sectional rear view of the spinning reel in accordance with the preferred embodiment of the present invention.
Figure 3:
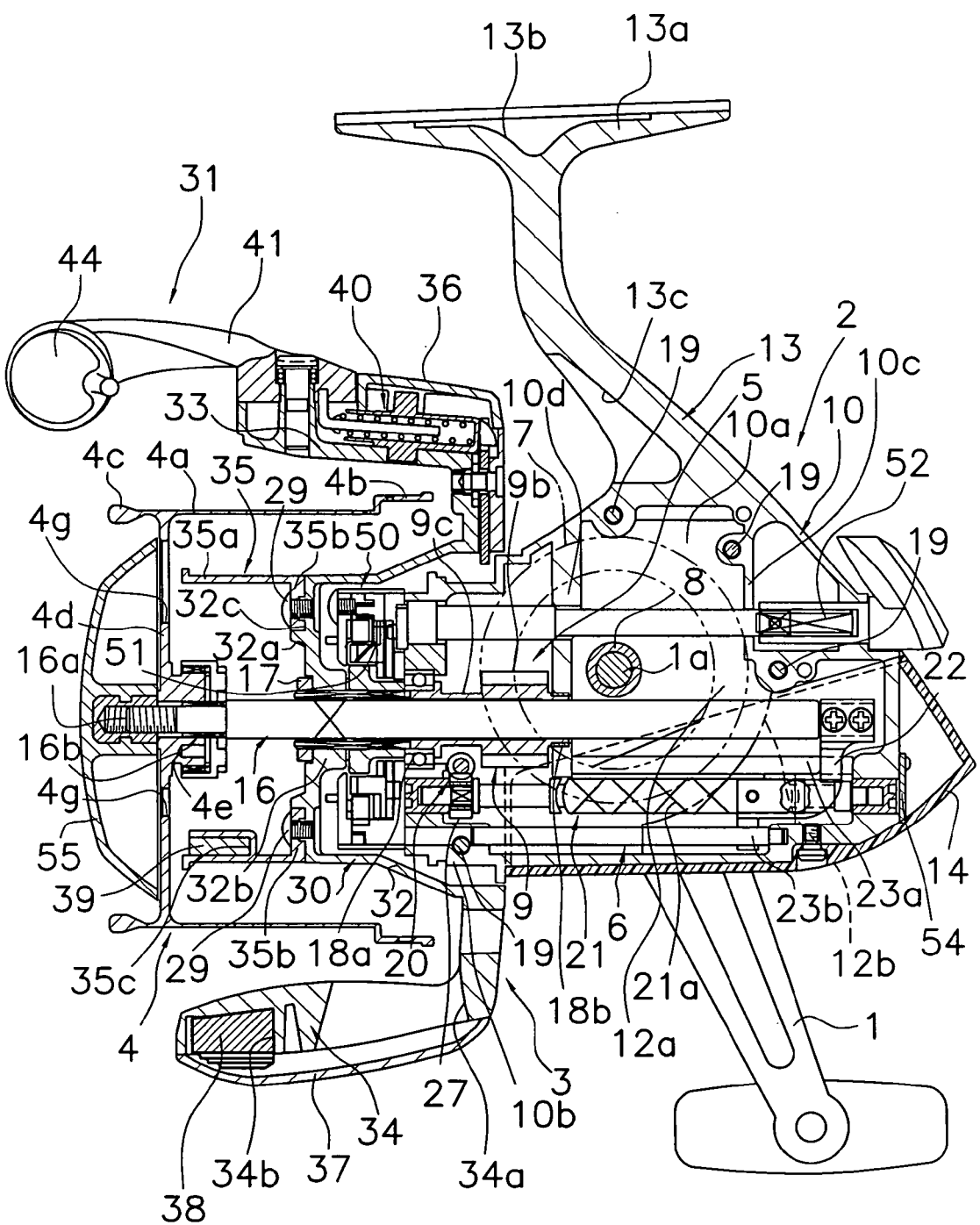
FIG. 3 is a side cross-sectional view of the spinning reel in accordance with the preferred embodiment of the present invention.

Referring to FIGS. 1 to 3, a spinning reel according to a preferred embodiment of the present invention primarily includes a handle 1, a reel unit 2, a rotor 3, and a spool 4. The reel unit 2 rotatably supports the handle 1 and is adapted to be mounted to a fishing rod (not shown). The rotor 3 is rotatively mounted on the front portion of the reel unit 2. The spool 4 is disposed on the front portion of the rotor 3, and moves front and rear relative to the reel unit 2. The spinning reel also includes a rotor drive mechanism 5 to drive the rotor 3 to rotate in cooperation with rotation of the handle 1. The handle 1 can be attached to the right side of the reel unit 2 as shown I FIG. 3, or to the left side as shown in FIGS. 1 and 2. The spinning reel further includes an oscillating mechanism 6 to move the spool 4 back and forth in cooperation with rotation of the rotor 3.

The reel unit 2 accommodates the rotor drive mechanism 5 and the oscillating mechanism 6 in the interior thereof. The reel unit 2 includes, as shown in FIGS. 1 to 4, a housing unit 10, first and second lids 11 and 12, a rod-attachment portion 13, and a cover member 14. The housing unit 10 has an opening on both sides thereof. The first and second lids 11 and 12 close both sides of the accommodation space 10a of the housing unit 10. The rod-attachment portion 13 is formed integrally with the housing unit 10. The cover member 14 covers the housing unit 10 and both lids 11 and 12 from the rear ends thereof.

The surface of the housing unit 10 is preferably formed of an anodic oxide film. The housing unit 10 is made of, for example, a magnesium alloy, which is lightweight and capable of maintaining a specific strength. Further, the housing unit 10 is a frame-shaped member in which both surfaces are opened to form an accommodation space 10a that accommodates and supports the rotor drive mechanism 5 and the oscillating mechanism 6, both of which are included in the drive mechanism that drives the spool 4 and rotor 3. The housing unit 10 has a substantially uniform depth dimension (the dimension along the orthogonal direction to the plane of FIG. 3). A disk-shaped mechanism support portion 10b is formed in the front surface of the housing unit 10. The disk-shaped mechanism support portion 10b has a pinion gear 9 (later-described), a one-way clutch 51 (later-described) for an anti-reverse mechanism 50, and the like mounted thereto. An operation support portion 10c to support a switching operation unit 52 (later-described) of the anti-reverse mechanism 50 is formed in the rear portion. An intermediate support portion 10d for supporting the pinion gear 9 and the switching operation unit 52 extends downward from the upper portion at the rear of the mechanism support portion 10b.

The first lid 11 is preferably made of an aluminum alloy that can maintain high specific strength and corrosion resistance. The first lid 11 is formed to cover a first side (the left side as viewed in FIG. 2) of the housing unit 10. The first lid 11 is, as shown in FIG. 2, disposed adjacent to a master gear 7 which is disposed inside the accommodation space 10a. In other words, the first lid 11 interposes the master gear 7 with the housing unit 10. As is clear from FIGS. 1, 2, and 4, the first lid 11 includes a first cover portion 11a and a first cut-out 11b. The first cover portion 11a covers the master gear 7 that rotates according to rotation of the handle 1 in the opening of one side of the housing unit 10. The first cut-out 11b exposes an opening rearward from the first cover portion 11a (further rearward than the portion indicated by the dashed line in FIG. 1). This type of first cut-out 11b is formed to minimize the overlapping portion between the first lid 11 and the cover member 14 to achieve weight reduction.

Figure 4:
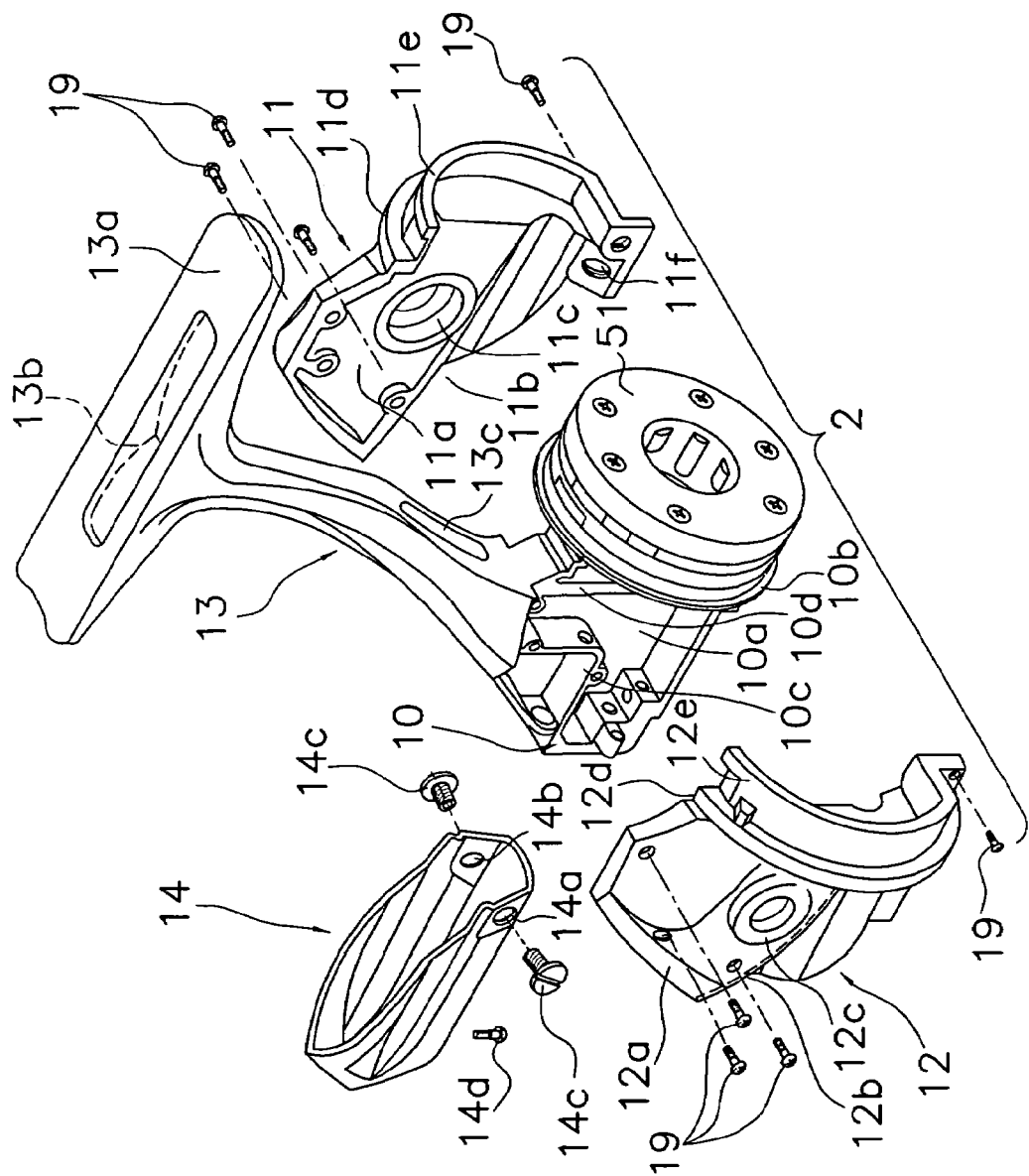
FIG. 4 is an exploded perspective view of a reel unit of the spinning reel in accordance with the preferred embodiment of the present invention.

As shown in FIGS. 2, 3, and 4, a first boss portion 11c (first shaft support portion) that supports one end of a master gear shaft 8 on which the master gear 7 is arranged on the back side of the master gear 7. In this embodiment, the master gear 7 and the master gear shaft 8 are integrally formed as a one-piece unitary member. However, the master gear and the master gear shaft may be separate members that are non-rotatably coupled to each other so as transmit rotation of the handle. The first boss portion 11c is formed on the first cover portion 11a of the first lid 11, and protrudes outward on the approximate central portion of the surface of the fist cover portion 11a. An approximately semi-circular first flange portion 11d that constitutes a disk-shaped portion that enters inside the rotor 3 is formed on the front portion of the first lid 11. An approximately semi-circular arc-shaped first mechanism accommodating cover le is disposed on the rear surface of the mechanism support portion 10b, and is approximately flush with the outer peripheral surface of the mechanism support portion 10b. The first mechanism accommodating cover 11e is formed on the front portion of the first flange portion 1d. Since the master gear 7 is adjacently arranged to the first lid 11, a large force tends to act on the first boss portion 11c when the master gear shaft 8 receives a large load. In view of this, the first lid 11 is preferably made of metal in order to keep the specific strength high. In a lower front portion of the first lid 11, a first screw hole 11f is formed to fit the cover member therein 14 and to perform maintenance such as draining water after washing or filling with grease.

The second lid 12 has a shape that is substantially symmetrical and has a mirror image relationship with the first lid 11. The second lid 12 covers a second side (the right side as seen in FIG. 2) of the housing unit 10. Provided therewith are a second cover portion 12a, a second cut-out 12b, a second boss portion 12c (second shaft support portion), a second flange portion 12d having substantially a mirror image relationship with the first flange portion 1d, and a mechanism accommodating cover 12e. A second screw hole 12f (see FIG. 2) is also formed at a location opposing the first screw hole 11f. The first and second flange portions 11d and 12d are formed to constitute a circular shape together with the outer peripheral surface of the rear of the mechanism support portion 10b of the housing unit 10. This circular portion is configured to be inserted in the rear of the rotor 3 at a slight gap. The second lid 12 is arranged relatively far from the master gear 7, so a large force is not likely to act on the second boss portion 12c. Thus, in order to reduce the weight thereof, the second lid 12 is made of a synthetic resin such as nylon 66. The second boss portion 12c is formed to protrude outward on the approximate central portion of the wall surface of the second lid 12 and opposing the first boss portion 11c. The second boss portion 12c supports the other end of the master gear shaft 8.

It should be noted that both the lid portions 11 and 12 are fastened by fastening screws 19 such as round-head screws to the housing unit 10. Various modifications are conceivable for the method of fastening the lids 11 and 12, for example, they may be fastened by screws passing from one of the lids to the other lid through the housing unit 10.

The rod-attachment portion 13 is a T-shaped member extending upward from the housing unit 10, and a reel foot 13a formed on the tip thereof and extending longitudinally is mountable onto a reel seat (not shown) of a fishing rod. The rod-attachment portion 13 is formed so that thickness-reducing portions 13b and 13c are formed in its upper face and front face to attain weight reduction and uniform wall thickness.

The cover member 14 is curved to cover the sides and the bottom of the housing unit 10 onto which the first and second lids 11 and 12 are mounted from the rear thereof. The cover member 14 is provided in order to close the first and second cut-outs 11b and 12b formed at the rear of the first and second lids 11 and 12, and to prevent from being scratched the side and rear faces of the reel unit 2 including its rear end corner. The cover member 14 is preferably made of a relatively hard synthetic resin such as ABS resin, and its surface is subjected to metal plating. In the cover member 14, stepped screw-fitting holes 14a and 14b are formed at the locations corresponding to the first and second screw holes 11f and 12f. A screw member 14c screwed through the first and second screw holes 11f and 12f is screwed through these screw-fitting holes 14a and 14b so that the cover member 14 is fastened to both of the lids 11 and 12, and also can be opened for maintenance. The cover member 14 is screwed onto the lower surface of the housing unit 10 at the rear end of the lower surface of the cover member 14. It is also fixed by a screw member 14d, which attaches to the bottom of the housing unit 10.

With a reel unit 2 thus configured, the first lid 11, which is arranged adjacent to the master gear 7 and is thus likely to be acted on by a relatively large force, can be made to have a high specific strength. Further, weight reduction is made possible because the first lid 11 is made of an aluminum alloy, which is lightweight and has a high specific strength. Moreover, since the second lid 12, which is far from the master gear 7 and is thus unlikely to be acted on by such a large force, is made from a synthetic resin, weight reduction is achieved. Furthermore, since the housing unit 10 is made of a magnesium alloy, the specific strength of the reel unit 2 as a whole is kept high and weight reduction is attained.

Rotor Drive Mechanism

The rotor drive mechanism 5 includes the master gear shaft 8 into which a handle shaft 1a of the handle 1 is screwed, the master gear 7 formed integrally with the master gear shaft 8, and the pinion gear 9 that meshes with the master gear 7.

The master gear shaft 8 is rotatively mounted to the reel unit 2 by bearings 15a and 15b fitted onto the first and second boss portions 11c and 12c formed in the respective lids 11 and 12 of the reel unit 2. Threaded portions 8a and 8b are respectively formed on the inner circumferential surfaces of both ends of the master gear shaft 8. The threaded portions 8a and 8b are screws that are tightened when the handle 1 is rotated in a line reel-in direction. Therefore, the threaded portion 8a on the left of FIG. 2 is a left-hand screw, whereas the threaded portion 8b on the right of FIG. 2 is a right-hand screw. It should be noted that the handle 1 can be attached to either end of the master gear shaft 8, either to the left side as shown in FIGS. 1 and 2 or the right side as shown in FIG. 3. Nevertheless, since the threaded portions 8a and 8b have different tightening directions, respective handle shafts 1a are made available for specific use in attaching the handle shaft 1a on respective sides. FIG. 2 shows the handle shaft 1a for the left handle.

As shown in FIG. 3, the pinion gear 9 is a hollow tubular member, and its front portion passes through the rotor 3 and is mounted non-rotatably to the rotor 3. A spool shaft 16 is disposed to pass through the inner circumference of the pinion gear 9. A nut 17 is fitted to the front of the pinion gear 9, and the rotor 3 is unrotatably coupled to the pinion gear 9 by the nut 17. The pinion gear 9 is supported rotatably by the respective bearings 18a and 18b at its mid-portion and rear end portion with respect to the shaft axis in the housing unit 10 of the reel unit 2. The bearing 18a is fitted to the mechanism support portion 10b, and the bearing 18b is fitted to the intermediate support portion 10d. A ring-shaped cut-out 9c is formed in the gear portion 9b formed on the rear end side of the pinion gear 9. The ring-shaped cut-out 9c is provided in order to house compactly a later-described gear-down train 20. Since rotor drive mechanisms are a conventional device well known in the art, the structure and function of the rotor drive mechanism 5 will not be explained in further detail herein.

Oscillating Mechanism

As shown in FIGS. 2 and 3, the oscillating mechanism 6 includes the gear-down train 20, a worm shaft 21, a slider 22, and two guide shafts 23a and 23b. The gear-down train 20 meshes with the pinion gear 9. The worm shaft 21 rotates in cooperation with the gear-down train 20. The slider 22 engages with the worm shaft 21 and moves back and forth relative to the reel unit 2. The two guide shafts 23a and 23b guide the slider 22 in the spool shaft 16 direction.

Figure 5:
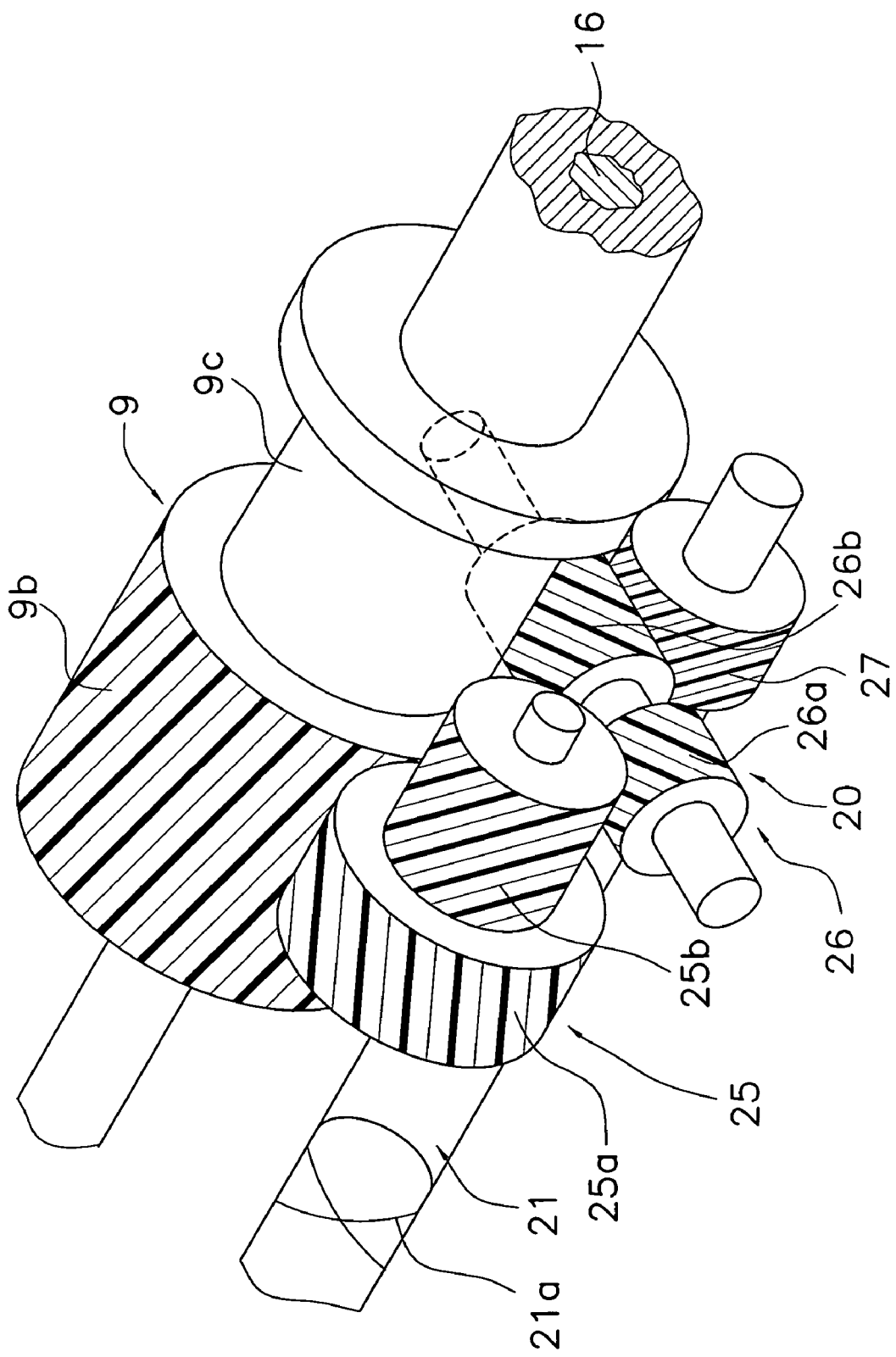
FIG. 5 is a perspective view of a gear-down train of the spinning reel in accordance with the preferred embodiment of the present invention.

As shown in FIGS. 3 and 5, the gear-down train 20 includes a stepped gear 25, a first intermediate gear shaft 26, and a driven gear 27. The stepped gear unit 25 has a large diameter gear 25a and a small diameter gear 25b that mesh with the pinion gear 9. The first intermediate gear shaft 26 includes a first intermediate gear 26a that meshes with the small diameter gear 25b and a second intermediate gear 26b spaced apart from the first intermediate gear 26a. The driven gear 27 is fitted non-rotatably to the worm shaft 21 that meshes with the second intermediate gear 26b.

The stepped gear unit 25 rotates around an axis parallel to the pinion gear 9 rotational axis. The large diameter gear 25a is a screw gear that meshes with the pinion gear 9. The small diameter gear 25b, the first intermediate gear 26a, the second intermediate gear 26b, and the driven gear 27 are also screw gears. The intermediate shaft 26 rotates around an axis different from that of the stepped gear unit 25. Further, the worm shaft 21, to which the driven gear 27 is fitted, rotates around an axis different from that of the intermediate shaft 26 and parallel to the pinion gear 9. The second intermediate gear 26b of the intermediate shaft 26 is disposed below the cut-out 9c of the pinion gear 9. As a consequence, the worm shaft 21 can be arranged closer to the pinion gear 9 than when the cut-out 9c is not formed, and thus the reel as a whole can be made compact. With the gear-down train 20 thus configured, the rotational speed of the pinion gear 9 is greatly reduced when transmitted to the worm shaft 21.

The worm shaft 21 has intersecting helical grooves 21a formed thereon, and is disposed parallel to the spool shaft 16. The worm shaft 21 is rotatively mounted on the front and rear ends of the housing unit 10 via bearings made of, for example, a synthetic resin. The worm shaft 21 is inserted from the rear of the housing unit 10, and is retained by a fixing plate 54 screwed to the rear surface of the housing unit 10.

Referring now to FIGS. 2 and 3, the slider 22 has an engaging member 22a that engages with the grooves 21a of the worm shaft 21. The slider 22 is non-rotatably and axially immovably coupled to the rear end of the spool shaft 16. With the tip of the engaging member 22a engaging with the grooves 21a, the slider 22 moves back and forth relative to the reel unit 2 in the spool shaft direction in accordance with rotation of the worm shaft 21, and thus, moves the spool shaft 16 back and forth in cooperation with rotation of the handle 1.

The guide shafts 23a and 23b pass through the slider 22, and guide the slider 22 along the spool shaft 16. The guide shaft 23a is fixedly held at both ends thereof by the rear end and the intermediate support portion 10d of the housing unit 10. The guide shaft 23a is mounted from the rear of the housing unit 10, and its rear end is retained by a fixing plate 54 that retains the worm shaft 21. The guide shaft 23b is fixed at both ends thereof by the front and rear ends of the housing unit 10. The guide shaft 23b is inserted from the front of the housing unit 10. The front portion of the guide shaft 23b contacts the fastening screw 19 that fastens the front portion of the first lid 11, such that the guide shaft 23 is retained by the fastening screw 19. Oscillating mechanisms are a conventional device well known in the art. Thus, the structure and functions of the oscillating mechanism 6 will not be explained further in detail herein.

Rotor

The rotor 3 is a so-called bail-less type of rotor in which a fishing line guide portion is provided on only one of the rotor arms. As shown in FIGS. 3 and 6 to 8, the rotor 3 includes a rotor unit 30 rotatively mounted to the reel unit 2 via the pinion gear 9, and a fishing line guide portion 31 fitted pivotably onto the rotor unit 30. The rotor unit 30 is made of, for example, a magnesium alloy on the surface of which has an anodic oxide film formed thereon. The rotor unit 30 includes a cylindrical support portion 32 and first and second rotor arms 33 and 34 spaced from the support portion 32 and extending forward from respective opposing locations on the outer peripheral surfaces of the rear end of support portion 32.

The support portion 32 is a substantially cylindrical member that is tapered so that its diameter decreases from the rear end toward the front and is then formed into a cylindrical shape. A front wall 32a is formed on the front portion of the support portion 32, and a boss portion 32b through which the front of the pinion gear 9 passes is formed in the central portion of the front wall 32a. The boss portion 32b is non-rotatably mounted to the front of the pinion gear 9. The nut 17 is screwed onto the front of the pinion gear 9 at the front of the front wall 32a, and the rotor 3 is fastened to the pinion gear 9 by the nut 17. A tubular-shaped line-entanglement prevention member 35 that prevents entanglement of fishing line with the spool shaft 16 is mounted at the front of the support portion 32.

A fishing line guide portion 31 is mounted on the tip of the first rotor arm 33 to be pivotable between a line-winding posture and a line-releasing posture. An interlocking mechanism 40 that interlocks with the pivoting of the fishing line guide portion 31 is mounted in the first rotor arm 33. The radially outward periphery of the first rotor arm 33 is covered by a first cover member 36.

Like the first rotor arm 33, the second rotor arm 34 extends forward and its radially outward periphery is covered by a second cover member 37. The second rotor arm 34 is provided for the purpose of maintaining the rotational balance of the rotor 3. For this reason, the second rotor arm 34 is configured such that its center of gravity is tilted forward in order to bring it close to the center of gravity of the first rotor arm 33 on which the fishing line guide portion 31 is mounted. In order to shift the center of gravity forward, an opening 34a is formed in the base end side of the second rotor arm 34, and a weight-accommodating portion 34b for mounting a weight 38 is formed in the tip side thereof. The weight 38 is made of, for example, a tungsten alloy. Further, in order to shift the center of gravity forward, the second rotor arm 34 extends forward at a length that is longer than that of the first rotor arm 33, as clearly seen from FIGS. 7 and 8.

Figure 6:
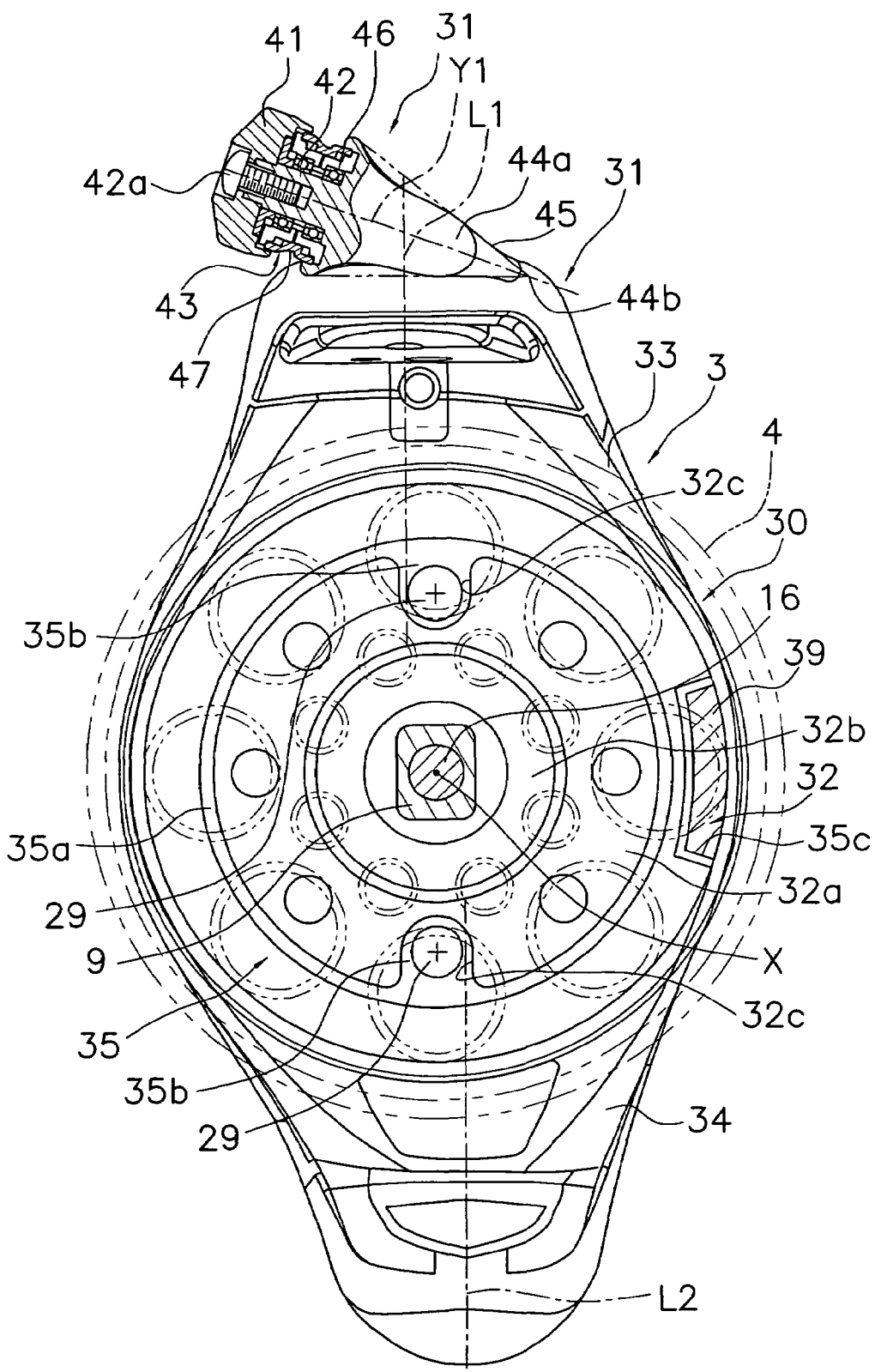
FIG. 6 is a front view of a rotor of the spinning reel in accordance with the preferred embodiment of the present invention.

Here, as shown in FIG. 6, the two rotor arms 33 and 34 are formed such that a first line L1 drawn through the pivot center of the fishing line guide portion 31 of the first rotor arm 33 and a second line L2 drawn through the width-wise center of the second rotor arm 34 and substantially parallel to the first line L1 are arranged so that they are spaced at the same distance from the rotational axis X of the rotor unit 30 on opposite sides thereof. When the rotor arms 33 and 34 are arranged in this manner, the rotational balance can be maintained at an even more desirable level even if the fishing line guide portion 31 is tilted outward from the rotational axis X (outward with respect to the first line L1 in FIG. 6).

Referring now to FIGS. 3 and 6, the line-entanglement prevention member 35 includes a cylindrical entanglement-preventing portion 35a formed to be flush with the cylindrical portion of the support portion 32, and a pair of tongue-shaped attachment portions 35b provided on the rear end of the entanglement-preventing portion 35a and opposed to the center. The tip of the entanglement-preventing portion 35a has a larger diameter than the rest of the entanglement-preventing portion 35a, thereby preventing the fishing line that has entered the inside of the spool 4 from entering the rotor 3. In addition, a weight-accommodating portion 35c for accommodating a weight 39 for correcting rotational balance is formed on the inner peripheral surface of the tip of the entanglement-preventing portion 35a. The weight 39 is also made of, for example, a tungsten alloy. Note that the weight accommodating portion 35c is depicted in FIG. 3 as if it were formed at a location near the second rotor arm 34 for the sake of clarity in illustration. The weight accommodating portion 35c is actually disposed, as shown in FIG. 6, at the mid position between the two rotor arms 33 and 34 in the direction in which the fishing line guide portion 31 pivots. By disposing the weight accommodating portion 35c in this way, the rotational balance can be corrected by the weight 39 disposed on the opposite side of the fishing line guide portion 31 with respect to the rotational axis X, even if the fishing line guide portion 31 is tilted further away from the rotational axis X than the first line L1.

The line-entanglement prevention member 35 is fastened to the front wall 32a by two screw members 29 screwed from the front of the attachment portions 35b. The front face of the front wall 32a is formed to be a flat surface in a ring-like shape when the line-entanglement prevention member 35 is fitted, and even with the attachment portions 35b. In order to form such a flat surface with the attachment portions 35b on the front face of the front wall 32a, recessed portions 32c in which the tongue-shaped attachment portions 35b are fitted are formed in the front wall 32a. Accordingly, the structure is configured so that even when foreign matter enters from the spool 4 side and attaches to the spool 4, the foreign matter can be easily removed by detaching the spool 4 and, for example, wiping it off.

Figure 7:
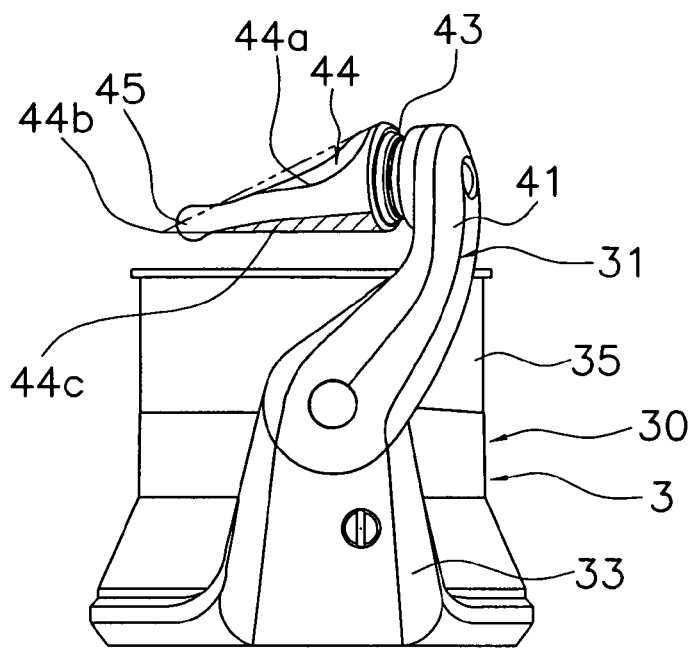
FIG. 7 is a right side view of the rotor in accordance with the preferred embodiment of the present invention.
Figure 8:
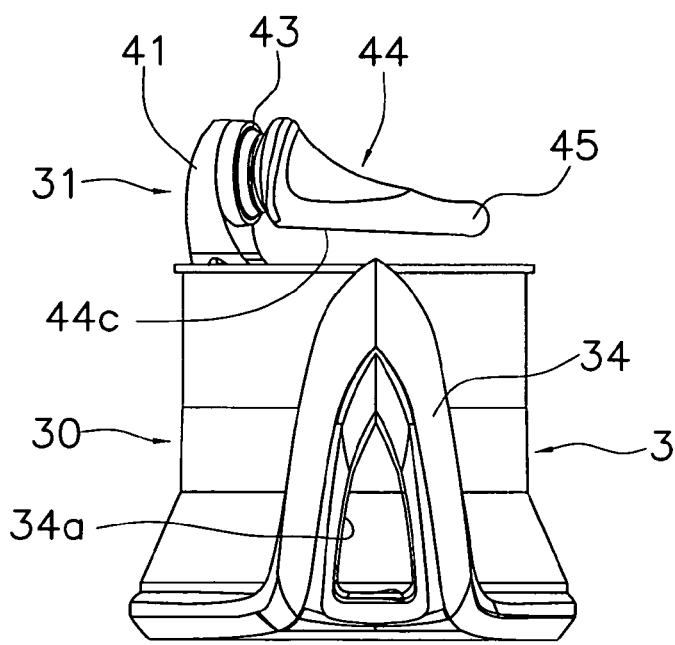
FIG. 8 is a left side view of the rotor in accordance with the preferred embodiment of the present invention.

The fishing line guide portion 31 includes, as shown in FIGS. 6 to 8, a support member 41, a stationary shaft 42, a line roller 43, a stationary shaft cover 44, and a fishing line-catching portion 45. The support member 41 is fitted to the tip of the first rotor arm 33. The stationary shaft 42 has a base end fixed to the tip of the support member 41. The line roller 43 is rotatively mounted to the stationary shaft 42, and is capable of guiding fishing line. The stationary shaft cover 44 is provided on the tip of the stationary shaft 42. The fishing line-catching portion 45 is provided on the tip of the stationary shaft cover 44, and catches the fishing line.

The support member 41 is fitted on the tip so that it can pivot between a line-winding posture and a line-releasing posture. The stationary shaft 42 is configured so that its base end is locked non-rotatably to the tip of the support member 41, and is fixedly attached to the support member 41 by a mounting bolt 42a. The line roller 43 is rotatively mounted on to the outer periphery of the stationary shaft 42 via a pair of bearings 46. A ring-shaped guide groove 47 to guide fishing line is formed on the outer peripheral surface of the line roller 43, and thus, line kinks do not easily occur. Both ends of the outer periphery of the line roller 43 are covered by the support member 41 and the stationary shaft cover 44.

The stationary shaft cover 44 is provided on the tip of the stationary shaft 42, and is an approximately cone-shaped member whose vertex 44b is tilted rearward from the shaft axis Y1 of the stationary shaft and toward the rotational center of the rotor 3. The region indicated by hatching in FIG. 7 that is near the ridge line of the stationary shaft cover 44 on the rear surface thereof forms the fishing line guide surface 44c that guides fishing line to the line roller 43. A thumb recess portion 44a that is recessed from the rest of the stationary shaft cover 44 is formed on the front face of the stationary shaft cover 44. This type of a thumb recess portion 44a is useful in returning the fishing line guide portion 31 from the line-winding posture to the line-releasing posture. The fishing line-catching portion 45 is formed so that it bulges below the vertex 44*b* to continue smoothly with its ridge line and protrude outwardly from the vertex 44*b*, and so that the tip thereof is thicker than the rest of the portion. The tip of the fishing line-catching portion 45 is rounded into a spherical shape.

With the fishing line guide portion 31 thus configured, the fishing line does not easily come off once it is caught by the fishing line-catching portion 45 because the tip of the fishing line-catching portion 45 is thicker than the other portions thereof. In addition, since the fishing line-catching portion 45 and the vertex 44*b* of the stationary shaft cover 44 are tilted rearward, the fishing line caught by the fishing line-catching portion 45 can be reliably guided to the guide groove 47 of the line roller 43 by the line-guiding surface. Rotors are a conventional device well known in the art. Accordingly, the structure and functions of the rotor 3 will not be explained in further detail herein.

Anti-Reverse Mechanism

As shown in FIG. 3, the anti-reverse mechanism 50 can prohibit/permit the rotation of the rotor 3 in the line reel-out direction. The anti-reverse mechanism 50 includes the roller-type one-way clutch 51 fitted to the mechanism support portion 10*b* of the housing unit 10. The one-way clutch 51 can be switched between a reverse-rotation prohibited state and a reverse-rotation permitted state. The anti-reverse mechanism 50 further includes the switching operation unit 52 for switching the one-way clutch 51 between the reverse-rotation prohibited state and the reverse-rotation permitted state. The switching operation unit 52 is supported pivotably by the operation support portion 10*c* and the intermediate support portion 10*d* of the housing unit 10.

Figure 9:
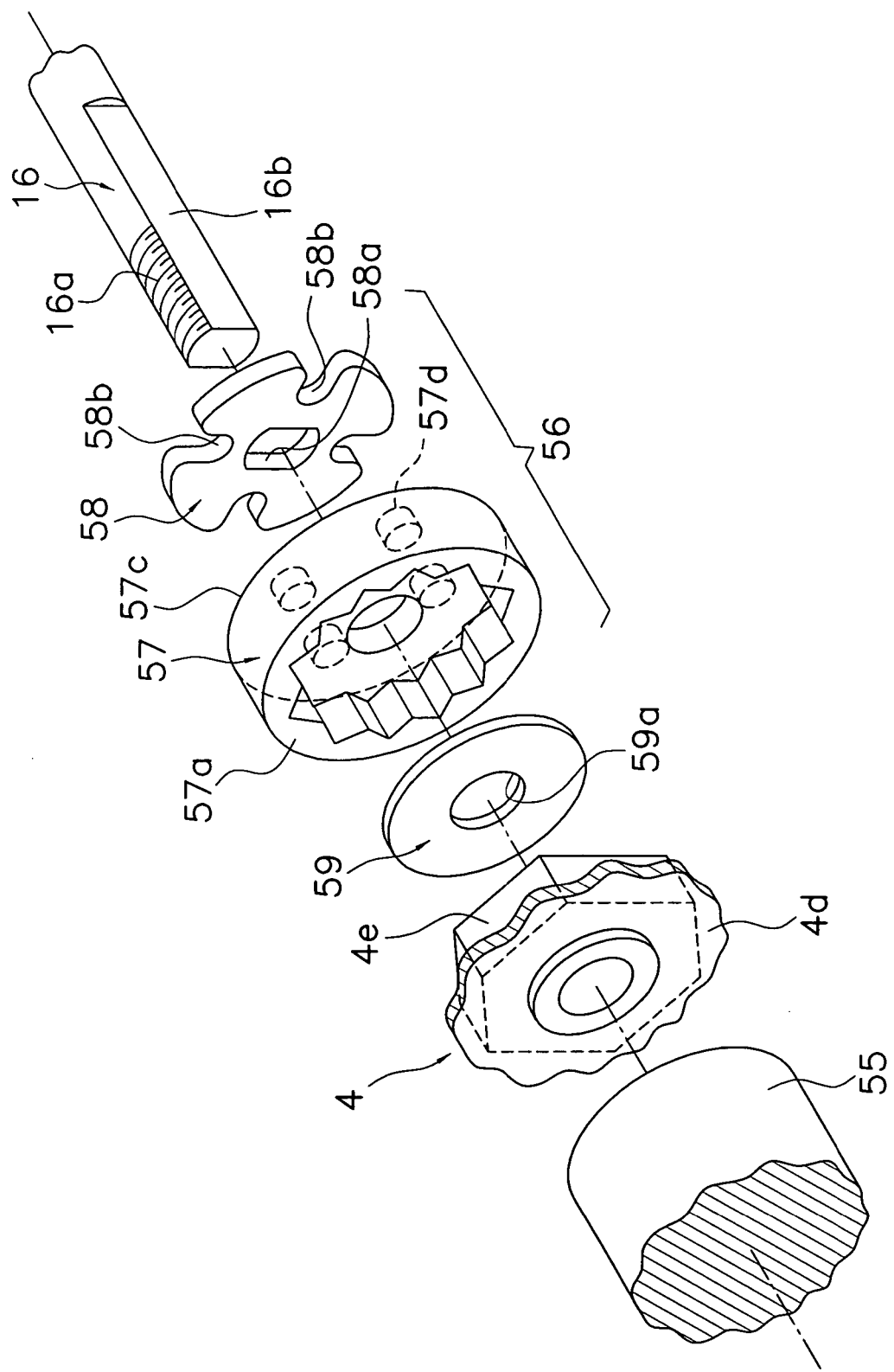
FIG. 9 is an exploded perspective view illustrating a mounting structure of a spool of the spinning reel in accordance with the preferred embodiment of the present invention.

As shown in FIG. 9, a male threaded portion 16*a* and chamfered portions 16*b* that are cut out parallel to each other are formed on the tip or fore-end of the spool shaft 16. Further, the spool 4 is fitted non-rotatably and detachably to the spool shaft 16 by a removable nut 55 that is screwed on the male threaded portion 16*a*.

As shown in FIG. 3, the spool 4 has a shallow-channel contour. The spool 4 includes a bobbin trunk 4*a*, a cylindrical skirt portion 4*b*, and a front flange 4*c*. Fishing line is wound around the outer periphery of the bobbin trunk 4*a*. The cylindrical skirt portion 4*b* is formed on the rear end of the bobbin 4*a* to have a larger diameter than the bobbin 4*a*. The front flange portion 4*c* is formed on the front end of the bobbin 4*a* to have a slightly larger diameter than the bobbin 4*a*.

The bobbin 4*a* is non-rotatable relative to the spool shaft 16, and is arranged on the outer peripheral side of the support portion 32 and the line-entanglement prevention member 35 of the rotor 3. The bobbin 4*a* includes a front wall portion 4*d* formed integrally with the tip side of the inner periphery of the bobbin 4*a*, and a boss portion 4*e* formed integrally with the inner peripheral side of the front wall portion 4*d* to protrude rearward. The front wall portion 4*d* has a number of perforations 4*g* formed therein that serve to reduce weight.

As shown in FIG. 9, the boss portion 4*e* has a regular hexagonal outer shape. The boss portion 4*e* is fitted rotatably to the spool shaft 16, but is made non-rotatable relative to the spool shaft 16 with a mounting member 56. The mounting member 56 includes a boss-engagement portion 57 to engage non-rotatably with the boss portion 4*e*, and an engagement member 58 to make the boss-engaging portion 57 non-rotatable relative to the spool shaft 16. The boss-engagement portion 57 includes an interlock recess 57*b* that has a twelve-point star-like cross section. The interlock recess 57*b* is formed in a front face 57*a* of the boss-engagement portion 57 opposing the boss portion 4*e*. The four circular interlock projections 57*d* engage with the engagement member 58 provided on a rear face 57*c* of the boss-engagement portion 57. The engagement member 58 is a disk-like member having at its center a slit 58*a* configured to engage non-rotatably the chamfered portions 16*b* of the spool shaft 16. Also provided on its outer peripheral surface are four interlock grooves 58*b* to interlock with the interlock projections 57*d*. By fitting the slit 58*a* with the chamfered portions 16*b*, the engagement member 58 is fitted non-rotatably to the spool shaft 16. By interlocking the interlock projections 57*d* with the interlock grooves 58*b*, the boss-engagement portion 57 is made non-rotatable relative to the spool shaft 16. It should be noted that a washer member 59 made of an elastic material is fitted in the interlock recess 57*b* of the boss-engagement portion 57. The washer member 59 has a hole 59*a* having an unstretched or relaxed inner diameter slightly smaller than the outer diameter of the spool shaft 16. By fitting the hole 59*a* onto the spool shaft 16, back-and-forth movement of the boss-engagement portion 57 and the engagement member 58 is restricted relative to the spool shaft 16.

By engaging the interlock recess 57*b* having a star-like cross section with the boss portion 4*e* having a hexagonal cross section, the spool 4 can be fitted onto the spool shaft 16 non-rotatably with a 30-degree rotational phase. Consequently, the spool 4 can be rotated by merely loosening the removable nut 55, and the hanging length of the tackle can be adjusted without rotating the rotor 3.

As shown in FIG. 1, the skirt portion 4*b* has formed thereon a number of perforations 4*f* having varied inner diameters that serve to reduce weight. The front flange portion 4*c* has a tapered outer peripheral surface that slightly increases in diameter from the outer peripheral surface of the bobbin 4*a* toward the front. This greatly reduces the release resistance that acts on fishing line when casting.

Next, handling and operation of the spinning reel will be described.

It should be noted that the description of the handling describes a situation in which casting is performed with the right hand. Initially referring to FIGS. 1 and 3, when casting, the fishing line guide portion 31 is put in the line-winding posture to hook the fishing line on the fishing line guide portion 31, and the hanging length of the tackle is then adjusted.

First, the handle 1 is rotated in the line reel-in direction so that the fishing line guide portion 31 is in a predetermined rotational phase in which the spool 4 is disposed near the tip of its stroke. Specifically, when casting with the right hand, for example, the fishing line guide portion 31 is easily operated with the left hand when the fishing line guide portion 31 is on the left of the spool 4, viewed from the rod side, taking into consideration the operability of the fishing line guide portion 31 and the ease of picking up the fishing line.

Referring to FIG. 3, to change the hanging length of the tackle, the removable nut 55 is loosened and the spool 4 is moved forward to release the engagement between the boss portion 4*e* and the boss-engagement portion 57. The spool 4 is rotated in this state so that the hanging length of the tackle is adjusted to be at an appropriate position. After adjusting the hanging length of the tackle, the spool 4 is moved rearward to engage the boss portion 4*e* with the boss-engaging portion 57. At this time, the hanging length of the tackle can be finely adjusted since the boss portion 4*e* can engage with the boss-engagement portion 57 every 30 degrees. Then, the removable nut 55 is tightened, and the adjustment of the hanging length is thus completed.

Referring now to FIGS. 7 and 8, in this state, with the fingertip of the left hand (the hand not holding the fishing rod), the stationary shaft cover 44 of the fishing line guide portion 31 is grasped to pivot the fishing line guide portion 31 over to the line-releasing posture. When this is done, the stationary shaft cover 44 can be easily grasped and the fishing line guide portion 31 can be grasped and easily pivoted because the thumb recess portion 44a is formed on the stationary shaft cover 44. Then, fishing line wound on the spool 4 is grasped with the left hand, and the fishing rod is cast with the index finger of the right hand hooking the line.

After casting, the fishing line guide portion 31 is pivoted back from the line-releasing posture to the line-winding posture with the left hand, and the fishing line is grasped with the left hand to place it in the fishing line-catching portion 45 of the fishing line guide portion 31. The fishing line caught with the fishing line-catching portion 45 is guided through the fishing line guide surface 44c of the stationary shaft cover 44 to the guide groove 47 of the line roller 43. The handle 1 is slightly rotated in the line reel-in direction in this state to apply slight tension to the fishing line, and the rod is set aside.

Referring again to FIG. 3, when a fish is caught on the tackle and the handle 1 is rotated, the rotor 3 rotates in the line reel-in direction and the spool 4 is moved back and forth. At that time, rotation of the handle 1 is transmitted to the master gear 7 through the master gear shaft 8, rotating the rotor 3 through the pinion gear 9. In addition, the oscillating mechanism 6 is operated with the pinion gear 9 via the gear-down train 20, moving the spool 4 back and forth. Even if the fish is large and a large force acts on the master gear 7 during the winding operation, the specific strength of the first lid 11 that is disposed near the master gear 7 can be maintained at a high level because the first lid 11 is made of an aluminum alloy. Moreover, since the first lid 12 is made of a synthetic resin and the housing unit 10 is made of a magnesium alloy, weight reduction can be attained.

Here, by making the first lid 11 out of a light alloy, which has a small specific gravity among metals, it becomes possible to maintain a high specific strength of the first lid 11 that is disposed near the master gear 7 and on which a relatively large force tends to act, thus achieving weight reduction. In addition, the second lid 12, which is far from the master gear 7 and on which a large force tends not to act, can be made of a synthetic resin and thus the weight thereof can be reduced. Therefore, with regard to the reel unit 2 as a whole, the specific strength can be maintained and weight reduction achieved.

As used herein, the following directional terms "forward, rearward, above, downward, vertical, horizontal, below and transverse" as well as any other similar directional terms refer to those directions of the reel as used by the user. Accordingly, these terms, as utilized to describe the present invention should be interpreted relative to a reel equipped with the present invention.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) In the foregoing embodiment, the reel unit according to the present invention was described as a part of a bail-less type of spinning reel having a fishing line guide portion 31. However, the present invention may also be applied to a reel unit for a so-called standard spinning reel having bail arms, in which the fishing line guide portion includes first and second bail support members pivotably mounted to the tips of the first and second rotor arms, and a bail for coupling a stationary shaft cover of the first bail support member and the second bail support member.

(b) Although the housing unit 10 is made of a magnesium alloy in the foregoing embodiment, the material of the housing unit 10 is not limited to a magnesium alloy and may be any metal that is lightweight and has high specific strength, such as an aluminum alloy and a titanium alloy, or a synthetic resin that is lightweight and has a high specific strength, such as a glass fiber-reinforced nylon and a carbon fiber-reinforced resin.

(c) Although the material of the first lid 11 is an aluminum alloy in the foregoing embodiment, the first lid 11 may be made of any metal that is lightweight and has high specific strength, such as a titanium alloy.

Figure 10:
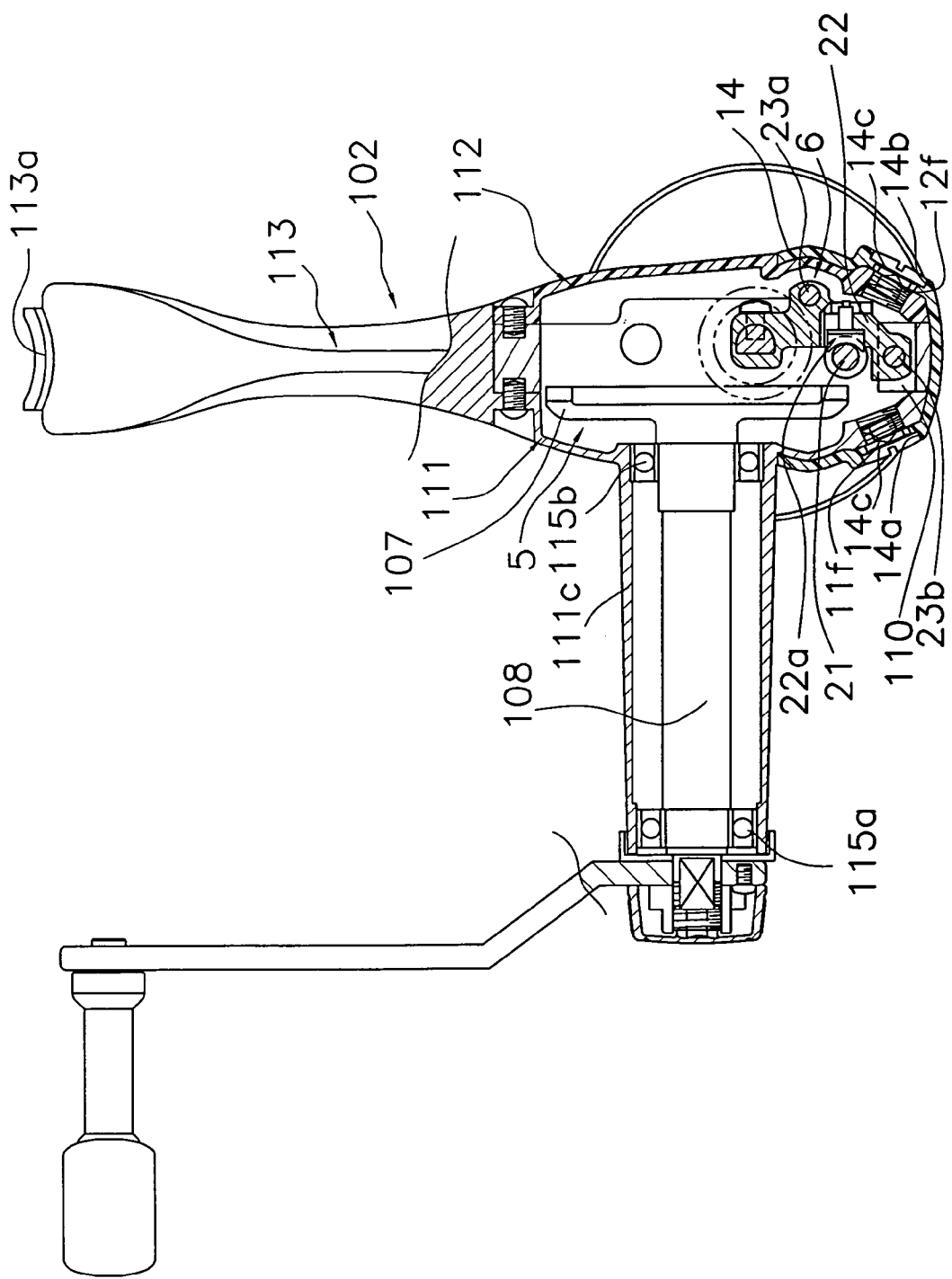
FIG. 10 is a cross-sectional rear view corresponding to FIG. 2 of the spinning reel view in accordance with an alternate embodiment of the present invention.

(d) Although the rod-attachment portion 13 is formed integrally with the housing unit 10 in the first embodiment, as shown in FIG. 10, a rod-attachment portion 113 may be formed integrally with a first lid 111, and not with a housing unit 110. In addition, in the first embodiment, the first and second lids 11 and 12 are provided with the boss portions 11c and 12c to support the master gear shaft. However, in this embodiment, a first lid 111 is provided with a tubular boss portion 111c (shaft support portion) to cantilever a master gear shaft 108 formed integrally with a master gear 107. The master gear shaft 108 is rotatively supported on the boss portion 11c by a pair of bearings 115a and 115b that are axially spaced apart on the boss portion 11c. Here, a second lid 112 is not provided with a boss portion and therefore has a smooth exterior appearance.

(e) Various modifications are conceivable for the method of fastening the lids. For example, they may be fastened by screws passing from one of the lid to the other lid through the housing unit.

Figure 11:
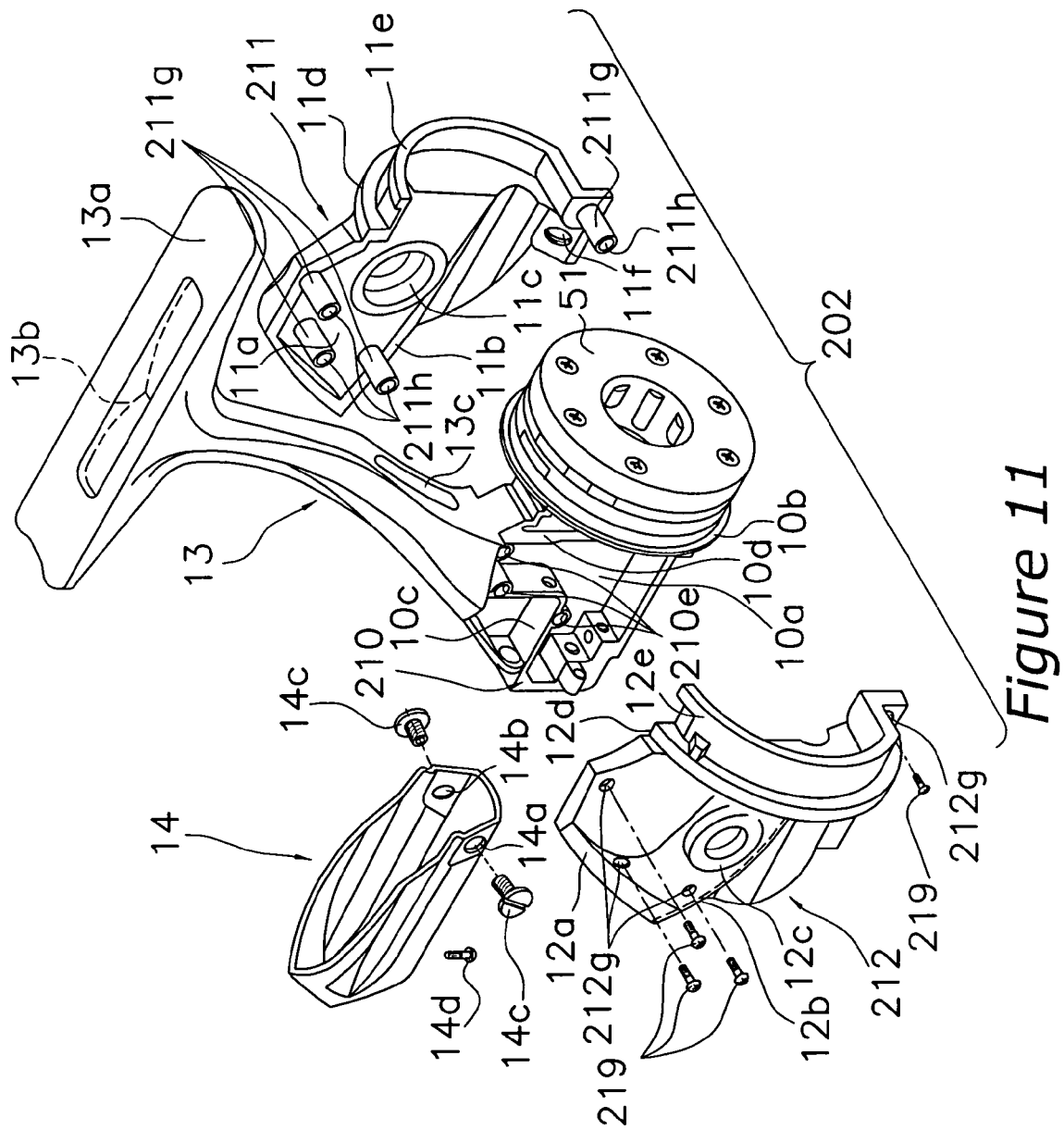
FIG. 11 is an exploded perspective view corresponding to FIG. 4 of a reel unit of the spinning reel in accordance with the alternative embodiment of the present invention.
Figure 12:
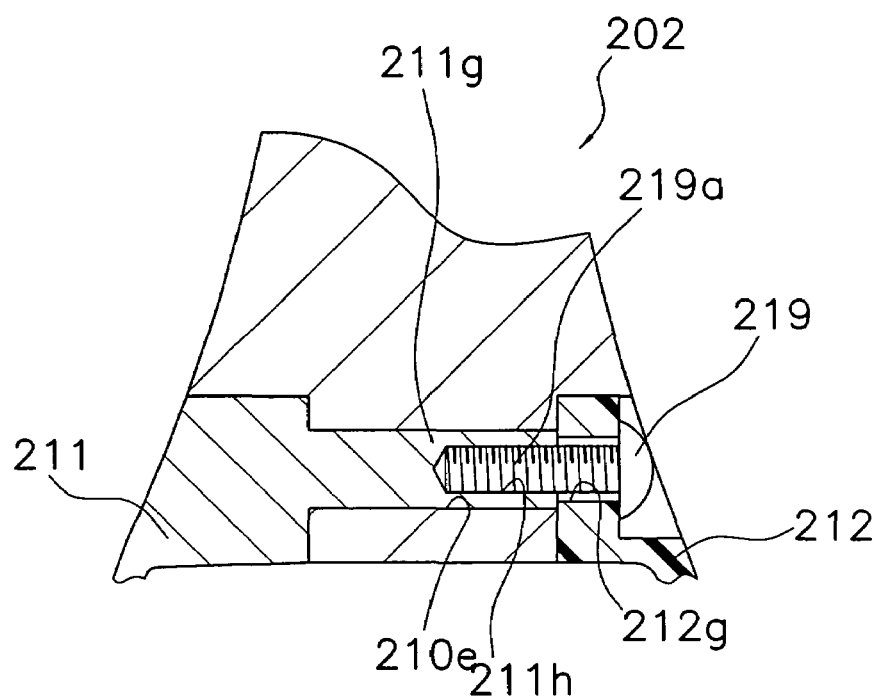
FIG. 12 is an enlarged view of a portion of the reel unit where the first and second lids are mounted to the housing unit in accordance with the alternative embodiment of the present invention.

For example, as shown in FIGS. 11 and 12, through holes 210e that pass through the side portions are provided in four locations (see FIG. 11) in the housing unit 210. In addition, four projections 211g that project toward the housing unit 210 are formed on the first lid portion 211, and four through holes 212g are formed in the second lid portion 212. Here, the first lid portion 211 and the second lid portion 212 are fixedly coupled to the housing unit 210 by inserting the projections 211g formed on the first lid portion 211 into the through holes 210e formed in the housing unit 210, passing screw members 219 through the through holes 212g of the second lid 212, and screwing the screw members 219 into the projections 211g. As shown in the enlarged view of FIG. 12, female threaded portions 211h are formed in the projections 211g, and male threaded portions 219a of the screw members 219 can be threadedly coupled into the female threaded portions 211h.

Figure 13:
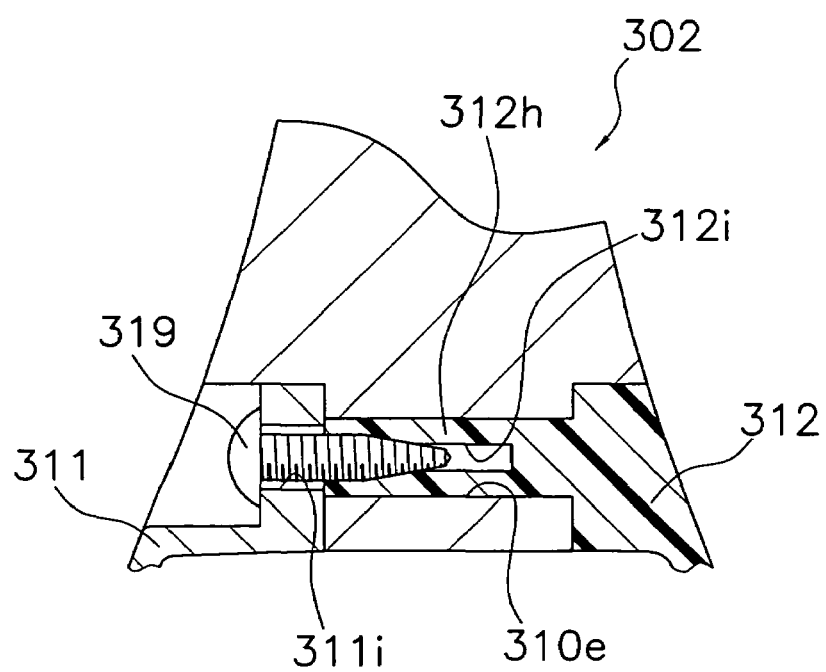
FIG. 13 is an enlarged view of a portion of the reel unit where the first and second lids are mounted to the housing unit in accordance with still another embodiment of the present invention.

(f) In the embodiment shown in FIG. 13, the projections are formed on the second lid portion 312. Although the projections 211g are formed on the first lid 211 made of metal and disposed near the master gear 7 in the embodiment of FIG. 12, projections 312h may be formed in the second lid portion 312 made of a synthetic resin and disposed away from the master gear as shown in FIG. 13. In addition, a tapping hole 312*i* may be formed in each projection 312*h*, and screw members 319 that are tapping screws may be passed through the through holes 311*i* of the first lid portion 311 and screwed therein.

According to the present invention, by making the first lid out of a light alloy which has a small specific gravity among metals, it will be possible to maintain a high specific strength of the first lid, to which the master gear is disposed nearby and a relatively large force tends to be applied, while reducing the weight of the first lid. In addition, the second lid, which is far from the master gear and on which a large force tends not to be applied, can be made out of a synthetic resin to reduce weight. Thus, with regard to the reel unit as a whole, the specific strength thereof can be maintained and the weight thereof can be reduced.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-028470 and 2003-047717. The entire disclosure of Japanese Patent Application No. 2003-028470 and 2003-047717 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reel unit for a spinning reel being adapted to be mounted to a fishing rod and configured to transmit rotation of a handle to a rotor to wind fishing line onto a spool, said reel unit comprising:
   a housing unit made of a magnesium alloy and having a mechanism accommodation space in an interior thereof;
   a master gear non-rotatably coupled to a master gear shaft and disposed inside said mechanism accommodation space for transmitting rotation of the handle to the rotor;
   a first lid made of an aluminum alloy and detachably and reattachably coupled to said housing unit so as to close said mechanism accommodation space and interpose said master gear with said housing unit, said first lid rotatably supporting said master gear shaft;
   a second lid made of a synthetic resin and detachably and reattachably coupled to said housing unit so as to close said mechanism accommodation space; and
   a rod-attachment portion being formed integrally with one of said housing unit and said first lid, said rod-attachment portion being adapted to be attached to the fishing rod.

2. The reel unit according to claim 1, wherein said first and second lids respectively have first and second shaft support portions that support said master gear shaft.

3. The reel unit according to claim 1, wherein said first lid has a shaft support portion to cantilever said master gear shaft.

4. The reel unit according to claim 3, wherein said shaft support portion rotatably supports said master gear shaft with a pair of bearings that are axially spaced apart.

5. The reel unit according to claim 1, wherein said rod-attachment portion is integrally formed with said housing unit.

6. The reel unit according to claim 1, wherein said rod-attachment portion is integrally formed with said first lid.

7. The reel unit for a spinning reel disclosed in claim 1, wherein
   said housing unit includes at least one through hole formed therein,
   one of said first and second lids includes at least one projection projecting toward said housing unit, said projection being inserted into said through hole formed in said housing unit, and
   the other of said first and second lids is coupled to said housing unit by being coupled to said projection with a screw member.

8. The reel unit disclosed in claim 7, wherein
   said first lid has said at least one projection, and
   said projection has a female threaded portion formed thereon, in which said screw member is threadedly coupled.

9. The reel unit for a spinning reel disclosed in claim 7, wherein
   said second lid has said at least one projection,
   said projection has a tapping hole formed thereon, and
   said screw member is a tapping screw that is threadedly coupled into said tapping hole.

10. A spinning reel being adapted to be mounted to a fishing rod, said spinning reel comprising:
   a handle;
   a reel unit rotatably supporting said handle and being adapted to be mounted to the fishing rod, said reel unit including
      a housing unit made of a magnesium alloy and having a mechanism accommodation space in an interior thereof,
      a drive mechanism being arranged inside said mechanism accommodation space, said drive mechanism having a master gear non-rotatably coupled to a master gear shaft,
      a first lid made of an aluminum alloy and detachably and reattachably coupled to said housing unit so as to close said mechanism accommodation space and interpose said master gear with said housing unit, said first lid rotatably supporting said master gear shaft,
      a second lid made of a synthetic resin and detachably and reattachably coupled to said housing unit so as to close said mechanism accommodation space, and a rod-attachment portion being formed integrally with one of said housing unit and said first lid, said rod-attachment portion being adapted to be attached to the fishing rod;

a rotor rotatably mounted on a front of said reel unit, said drive mechanism being for transmitting rotation of said handle to said rotor; and a spool disposed on a front of said rotor to move front and rear relative to said reel unit.

11. The spinning reel according to claim 10, wherein said first and second lids respectively have first and second shaft support portions that support said master gear shaft.

12. The spinning reel according to claim 10, wherein said first lid has a shaft support portion to cantilever said master gear shaft.

13. The spinning reel according to claim 10, wherein said rod-attachment portion is integrally formed with said housing unit.

14. The spinning reel according to claim 10, wherein said housing unit includes at least one through hole formed therein;

one of said first and second lids includes at least one projection projecting toward said housing unit, said projection being inserted into said through hole formed in said housing unit, and the other of said first and second lids is coupled to said housing unit by being coupled to said projection with a screw member.

15. The spinning reel according to claim 14, wherein said first lid has said at least one projection, and said projection has a female threaded portion formed thereon, in which said screw member is threadedly coupled.

16. The spinning reel according to claim 14, wherein:

said second lid has said at least one projection, said projection has a tapping hole formed thereon, and said screw member is a tapping screw that is threadedly coupled into said tapping hole.

* * * * *